Oct. 22, 1968     R. B. FRIDLEY     3,406,508
LIMB SHAKER FOR ATTACHMENT TO A TREE
Filed Aug. 6, 1965     3 Sheets-Sheet 1
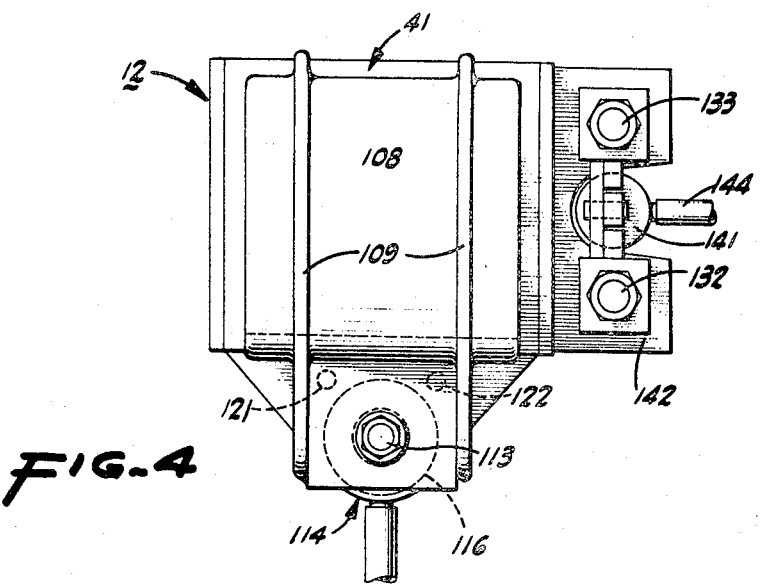
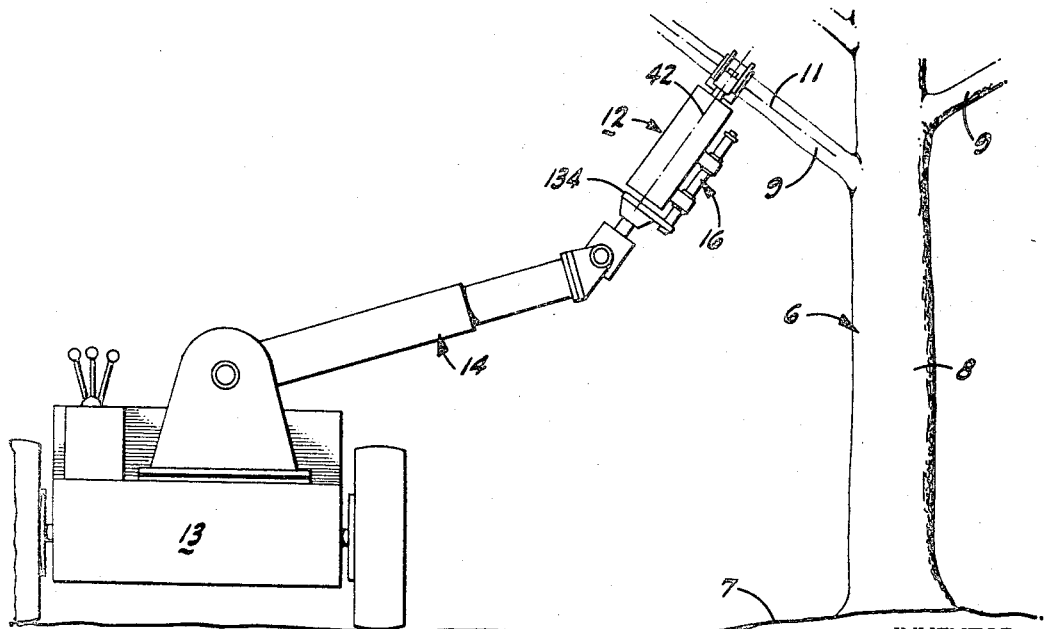
INVENTOR.
ROBERT B. FRIDLEY
BY
Lothrop & West
ATTORNEYS

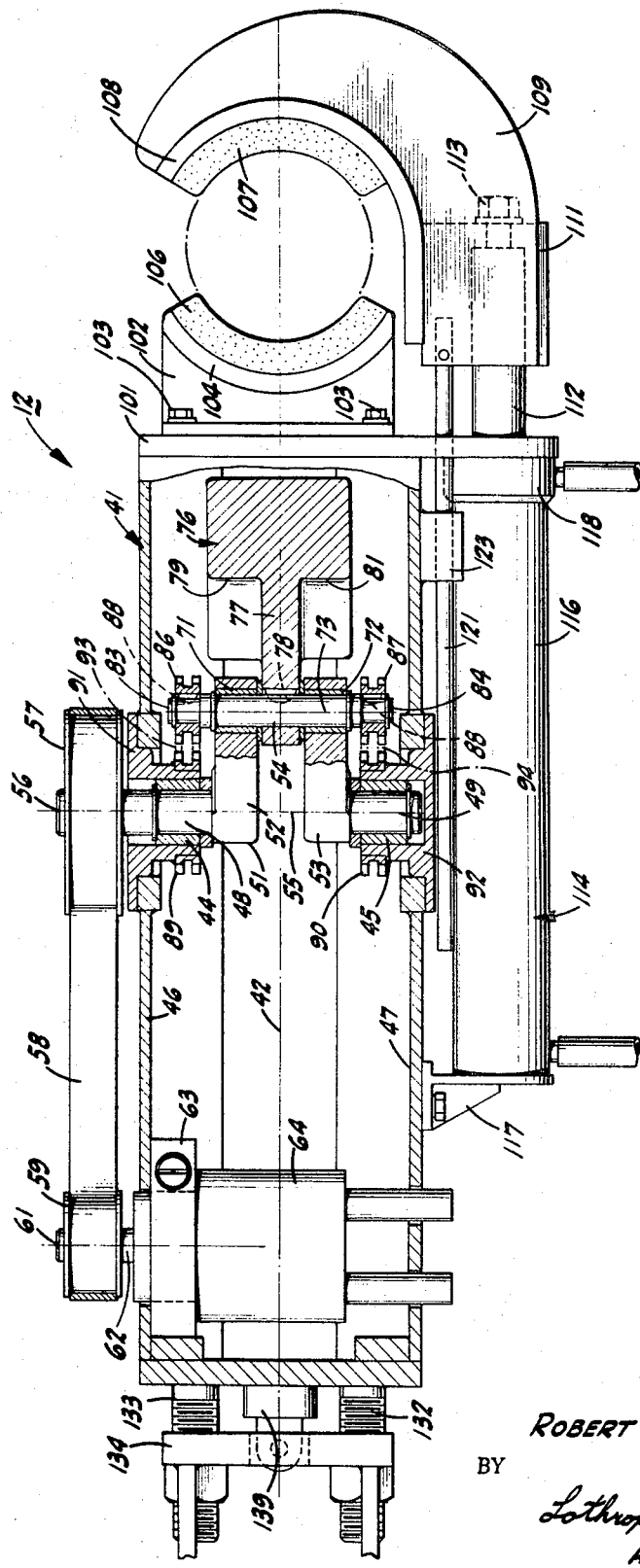

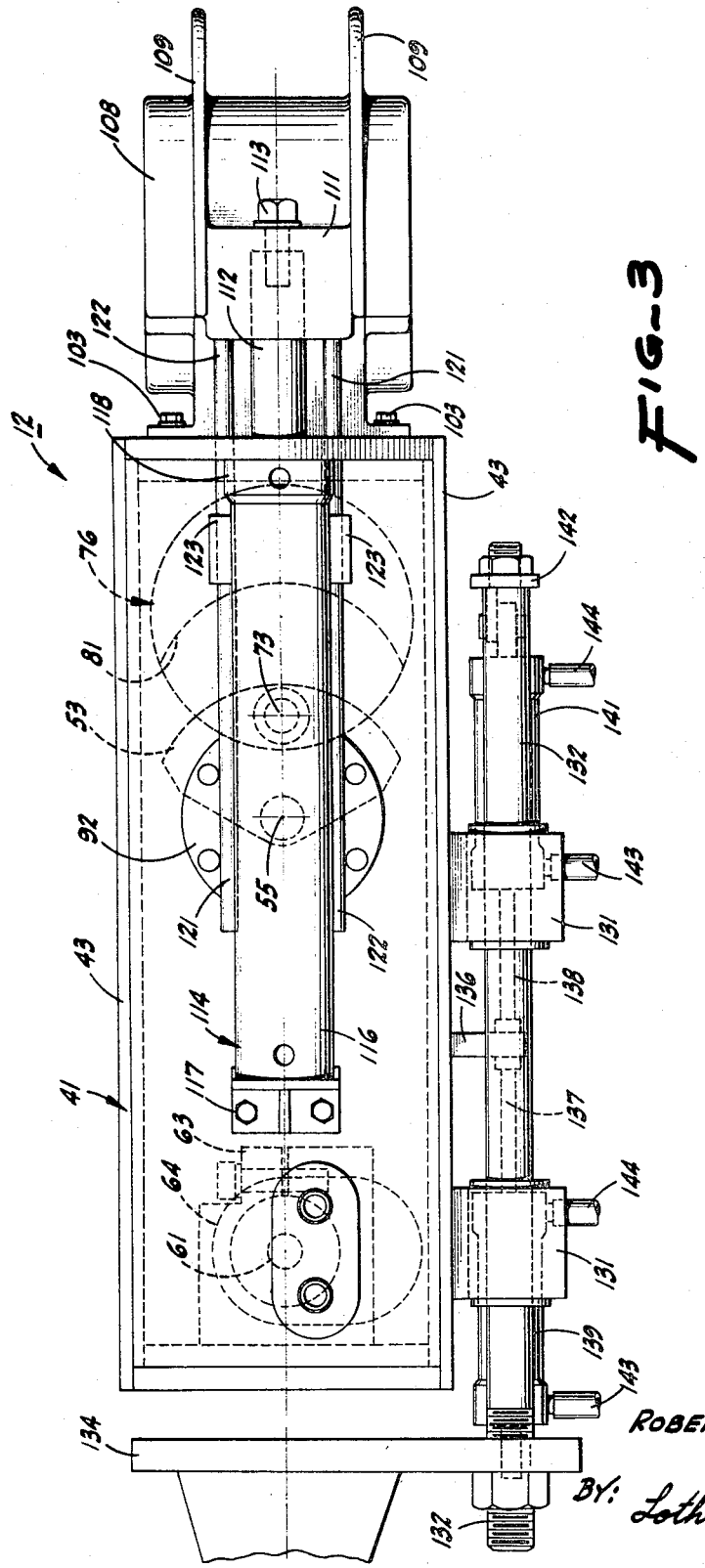

United States Patent Office 3,406,508
Patented Oct. 22, 1968

3,406,508
LIMB SHAKER FOR ATTACHMENT TO A TREE
Robert B. Fridley, Davis, Calif., assignor to the Regents of the University of California, Berkeley, Calif.
Filed Aug. 6, 1965, Ser. No. 477,819
7 Claims. (Cl. 56—328)

ABSTRACT OF THE DISCLOSURE

A limb shaker for attachment to a tree is mounted on a mobile boom and includes a frame housing carrying a motor driving a crank shaft journalled in the frame for rotation about a first axis. A crank pin to which a weight is fastened is journalled in the crank shaft for relative rotation about a second, parallel axis. A sprocket on the crank pin is connected by a chain to a sprocket of twice the diameter on the crank shaft so that the weight moves in a straight line and shakes a tree clamp mounted on the frame in the same straight line.

---

My invention relates to devices which are utilized for artificially or mechanically shaking the limbs of a tree in a fashion designed to dislodge the produce or fruit from the tree for harvesting purposes.

In recent years the gathering of fruit from trees has been increasingly effectuated by mechanical means as distinguished from manual labor. Reference to fruit is intended to refer not only to items normally classified as fruit such as prunes or plums, but also to nuts such as almonds and the like, and in fact is intended to include all arrangements in which the produce of a tree or shrub can economically be dislodged for harvesting purposes by shaking the structure of the tree or shrub.

In past years some progress has been made in supplying mechanical shakers which are attached in various fashions to the branches or limbs of trees in order to impart a vibratory shaking movement thereto of sufficient effect to remove the fruit from the tree. Some of these shakers are arranged with various vibratory modes and are arranged to operate at different amplitudes and frequencies. They are usually temporarily positioned at desired points on the tree limbs and are temporarily secured in the selected positions in order that the vibration of the machine can be transmitted without substantial loss to the tree. Difficulties sometimes arise in that it is awkward to position the vibrating structure because of the growth habit of the tree, and it is also difficult to arrange the tree shaker in such a manner that no injury is done to the tree itself, particularly to the bark and to the cambium layer.

It is therefore an object of the invention to provide a limb shaker for attachment to a tree which is so shaped and is so arranged that it can be utilized in conneciton with most trees of however compact growth and can be positioned in the desired attitude.

Another object of the invention is to provide a limb shaker which readily can be adapted for attachment to a tree limb with the main portion of the shaker extending substantially perpendicular to the limb.

Another object of the invention is to provide a limb shaker having a mechanical form of vibratory device effective to produce its major oscillations primarily in a predetermined direction perpendicular to the limb to which the device is attached.

Another object of the invention is to provide a limb shaker in which the tree clamping mechanism can be positioned and removed without injury to the tree and which will transmit vibrations of the shaker mechanism to the tree without injury thereto.

Another object of the invention is to provide a limb shaker which is rugged and sturdy and can withstand protracted use in the field without any substantial service or mechanical attention.

An additional object of the invention is to provide a limb shaker of an improved character.

Other objects together with the foregoing are attained in the embodiment of the invention described in the accompanying description and illustrated in the accompanying drawings, in which:

FIGURE 1 is a diagrammatic showing of the limb shaker pursuant to the invention attached to a tree limb and effective to shake the limb;

FIGURE 2 is a plan, certain portions being shown in cross section, of a limb shaker constructed in accordance with the invention;

FIGURE 3 is a side elevation of the structure shown in FIGURE 2; and

FIGURE 4 is an end elevation of the structure shown in FIGURE 2.

While the limb shaker can be utilized in a number of different ways, it has, for example, most successfully been utilized in connection with a tree 6 growing from the ground 7 and having a trunk 8 from which a number of branches 9 extend. The branches in various trees are disposed and extended in various fashions, but it is considered for present purposes that the general direction of extent of a branch or a substantial portion thereof is along an assumed axis, such as 11. This reference is primarily for use in describing the positioning and orienting of the mechanism since there is variation from tree to tree and usually there is no geometric exactness.

Customarily, the limb shaker 12 is brought to a position of use on a powered vehicle 13 movable over the ground 7 and having a boom 14 that can be moved about and variously positioned so as to move the shaker 12 in a comparable fashion. For initially positioning the shaker, the boom 14 and the shaker are provided with a lock mount 16. The lock mount is arranged so that when locked the shaker 12 is substantially immobile within itself. By appropriately orienting the boom, the shaker 12 can be positioned so as to extend in a plane that is perpendicular to the axis 11 of the limb or branch 9. The lock mount is only for initial positioning, however, since after the shaker has been appropriately located and has engaged the limb, the lock mount 16 is released. Substantially no restraint is thereafter imposed within the shaker. The shaker can move quite freely within itself and does not transmit any substantial force or motion back to the boom 14.

The shaker is made up of an elongated frame 41 of generally rectangular configuration approximately three to four times as long as it is wide so that the frame can be considered as elongated in the direction of its own axis 42. The frame is a hollow metallic box with appropriate cover plates 43 thereon affording access to the interior.

Mounted in primary journals 44 and 45 in the side walls 46 and 47 of the frame are the shaft bearing portions 48 and 49 of a crank shaft 51. The crank shaft in appearance, although not in detailed construction, is similar to the usual single throw crank shaft and includes a pair of crank cheeks 52 and 53 as well as a crank pin 54, all arranged for rotation about a first transverse axis 55 normal to the longitudinal axis 42. At one end the crank shaft extends to the exterior of the frame and has a hub 56 carrying a pulley 57 with which a belt 58 is engaged. The belt is preferably of the toothed variety and constitutes a part of a coupling means for joining the pulley 57 with a pulley 59 fast on the outboard end 61 of a motor shaft 62. This extends through a mounting 63 in the wall 46 to a hydraulic or electric motor 64 located within the interior of the elongated frame.

The motor 64, preferably hydraulic, is supplied with energy by leads extending along the boom 14 from a suitable source of power (not shown) on the vehicle 13. When the motor 64 rotates, it produces a corresponding rotation of the crank shaft through the belt 58. The particular ratio of speeds of rotation of the motor and of the crank shaft is not critical, but the pulley sizes illustrated are typical. In most every instance, the motor 64 is of variable speed so that the crank shaft can be rotated throughout a relatively wide range of speeds.

The crank pin 54, although similar in position to and in certain of its functions comparable to the usual crank pin, differs in the present instance. Instead of being fixed with respect to the crank cheeks 52 and 53, the crank pin is mounted in each of the crank cheeks by means of secondary journals 71 and 72. The crank pin is freely rotatable in the journals with respect to a second, transverse axis 73 parallel to the axis 55. With this arrangement, the crank pin 54 can rotate around its own axis 73 and the crank shaft as a whole can rotate around the axis 55 with respect to the frame. The crank pin 54 carries an eccentric weight 76 having a central tongue 77 extending between the crank cheeks 52 and 53 and made fast to the crank pin 54 by means of a key 78. The inertia weight or eccentric weight 76 is preferably approximately cylindrical for much of its configuration and is provided with crescent-shaped cut-away portions 79 and 81.

Particularly in accordance with the invention, the crank shaft and the crank pin are coupled in such a way that the crank pin 54 makes two rotations about its own axis 73 as the crank shaft 51 makes one rotation about its axis 55. This is accomplished by providing extensions 83 and 84 of the crank pin on the outboard sides of the crank cheeks 52 and 53 carrying a pair of duplex sprockets 86 and 87 each provided with a key 88 for securing it to the crank pin.

Aligned with each of the duplex sprockets 86 and 87 is the individual one of a pair of duplex sprockets 89 and 90 concentric with the first transverse axis 55. The sprockets 89 and 90 have a diameter twice that of the diameter of the sprockets 86 and 87. The sprockets 89 and 90 although concentric with the crank shaft are not fastened thereto, but rather are fixed on stationary quills 91 and 92 extending inwardly from the side walls 46 and 47 of the elongated frame 41. Trained around the duplex sprockets 89 and 86 is a duplex chain 93, and trained around the duplex sprockets 90 and 87 is a similar duplex chain 94.

With this arrangement, when the motor 64 is rotated to revolve the crank shaft 51, the crank pin 54 is moved in a circular path around the first transverse axis 55, but at the same time the duplex sprockets 86 and 87 move in a planetary fashion around the stationary sprockets 89 and 90. Since the various sprockets are connected by their respective chains 93 and 94, and since the diameters of the sprockets bear the ratio of two to one, the net result is to rotate the crank pin 54 in such a way that the eccentric weight 76 travels always in a rectangular or straight path within the elongated frame 41. The geometrical center of the circular portion of the eccentric weight 76, especially as seen in FIGURE 3, always travels in a rectilinear path coincident with and in effect translating along the longitudinal axis 42.

As the crank shaft rotates, the eccentric weight 76 in one extreme position of translation occupies a location near the right-hand end of the frame 41 as seen in FIGURES 2 and 3. As the crank shaft rotates through a quarter turn, the crank pin rotates through substantially a half turn so that the eccentric weight 76 then nests quite closely with the crank cheeks 52 and 53, the lunar cut-out portions 79 and 81 accommodating the crank cheeks under these conditions. As the crank shaft continues to turn about the axis 55 through the next quarter rotation, the two-to-one drive ratio moves the eccentric weight 76 so that it occupies the other extreme position toward the left-hand end of the frame 41 as seen in FIGURES 2 and 3. As the crank shaft completes its return half rotation, the center of the weight 76 similarly traverses the rectilinear path, returning then to its position as illustrated in FIGURE 2.

The operation of this structure, therefore, is effective repeatedly to translate a reciprocating mass between one end and the other of the elongated frame along the axis 42. While there are a few unbalanced forces acting out of the direction of the axis 42, a principal one perpendicular to the axis is largely balanced by the crank cheeks 52 and 53 when they are in positions substantially occupying the cut-outs 79 and 81. Otherwise, the crank cheeks add to the axial motion. Nearly all of the applied power produces axial oscillatory or vibratory motion.

When this crank shaft and eccentric weight structure is in operation, the frame 41, being the reacting body, is similarly vibrated at the same frequency and approximately at the same amplitude (when free) but in the reverse sense to or in a different phase relationship to the direction of vibration of the interior structure.

Advantage is taken of the vibratory structure for shaking the tree limb. Mounted on an end wall 101 of the frame spanning the distance between the side walls 46 and 47 is a first limb clamp member 102. This is a detachable structure held onto the frame 41 by fasteners 103 and is contoured to afford an arcuate base 104 somewhat larger than the arcuate curvature of the limb to be encountered. In a representative instance, the usual limbs are from four to five inches in diameter at the point of attachment of the shaker. Within the arcuate base 104 is mounted a primary clamping pad 106 usually of some resilient, accommodating material which can engage the rough bark of the tree limb with substantially a radial motion and without causing any injury thereto.

Arranged in confronting relationship with the pad 106 is a similar, secondary resilient clamping pad 107 of a complementary arcuate contour borne by an arcuate base plate 108 reinforced by a pair of arcuate fins 109. When positioned substantially around a limb of the recognized size range, the arcuate pads 106 and 107 occupy something more than the opposite quadrants of an annular figure.

In order appropriately to mount and move the secondary clamp member 108 with respect to the primary clamp member 104, the secondary member is provided with an anchoring boss 111 secured to the end of a plunger 112 by a fastening arrangement 113. The plunger 112 is part of a hydraulically expansible chamber mechanism 114 including a cylinder 116 within which the plunger 112 is reciprocable. The cylinder 116 is provided with mounting structures 117 and 118 to fasten it to the frame 41 so that the cylinder remains stationary but the plunger 112 can be expelled therefrom and retracted thereinto.

So that the plunger 112 dos not rotate within the cylinder, the plunger boss 111 is provided with a pair of guide rods 121 and 122. The rods operate in guide blocks 123 secured to the frame 41. Preferably the cylinder 116 is provided with hydraulic pressure fluid under manual control from a remote source (not shown).

When the plunger 112 is expelled by pressure fluid within the cylinder, the secondary clamp member is backed away from the primary clamp member and the distance between the closest parts thereof is sufficient so that the clamps can be located on opposite sides of a limb. It is important that the clamp members be arranged with their arcuate or circular cylindrical surfaces substantially concentric with the axis 11 of the tree limb before the clamps are engaged therewith. Also, it is an important feature that the mechanism can be arranged so that the axis 42 lies as nearly as possible perpendicular to the axis 11 of the tree limb when the two clamp elements are engaged.

As soon as the shaker is so arranged at a right angle to or perpendicular to the limb axis and at an appropriate point along the length of the limb, then the hydraulic fluid to the cylinder 116 is valved so that the second clamp member 108 is moved toward the first clamp member 104. With this orientation of the parts, the pads 106 and 107 engage the tree bark and impose only approximately radial and no substantial tangential forces on the bark. It has been found by experiment that movement of the clamps onto the tree limb with large tangential components or large components longitudinally of the limb are highly deleterious. It has also been found that to position a shaker at other than a right angle to the axis of the limb imposes longitudinal forces on the bark which tend to injure the bark, to separate the cambium and to leave cracks through which infection may attack the tree.

After the clamp members have been arranged at the proper perpendicular attitude, they are caused to approach each other closely enough so that they grip firmly but impose not more than a predetermined unit force on the tree bark. This force is limited by limiting the pressure of the hydraulic fluid within the cylinder 116. As an example, this force should not exceed two hundred fifty pounds per square inch of area of the pads 106 and 107 considered individually.

After the shaker has been so clamped onto a limb and after the lock mount has been completely freed and released so that the shaker is quite free to move, then the motor 64 is energized. This produces a rapid to-and-fro oscillation of the elongated frame 41 as a result of the rectilinear reciprocation of the eccentric weight 76 and in turn produces an almost purely perpendicular shaking force on the tree limb. Because of the substantial absence of tangential, lateral and longitudinal forces, the tree bark is not injured by the shaking and the cambium layer is unaffected. In this fashion it is possible, particularly by varying the speed of the motor 64 so that the tree limb is shaken at its resonant frequency, to dislodge all or substantially all of the fruit therefrom without any injury whatsoever to the tree bark.

At the conclusion of the shaking operation, the motor 64 is shut off and the hydraulic chamber 114 is expanded to free the clamps. At about this time the lock mount is again made rigid to stabilize the shaker. The lock mount includes blocks 131 on the frame 41 in which two rods 132 and 133 are slidably engaged. The rods are anchored to an end plate 134 near the end of the boom 14. A flange 136 projecting from the frame 41 between the rods 132 and 133 engages the piston rods 137 and 138 of a pair of hydraulic cylinders 139 and 141 secured at their ends to the plate 134 and to a strap 142 spanning the ends of the rods 132 and 133. The hydraulic cylinders are connected in a hydraulic circuit (not shown) by hose pairs 143 and 144. When the hydraulic circuit is open so that the piston rods 137 and 138 can move freely in the cylinders 139 and 141, the frame 41 is free to move with respect to the boom 14, but when the hydraulic circuit is closed, movement of the piston rods 137 and 138 is hydraulically blocked and the frame 41 is held fixed with respect to the boom 14.

Sometimes, as a variation, the tree or tree limb is not directly engaged, but is provided with a permanent bolt or lag screw projecting a convenient distance and preferably provided with a spherical head. In that instance, the clamps are adapted to grip the screw or bolt head and the shaker is oriented to shake the limb or tree substantially at a right angle to its axis or with the shaking forces perpendicular thereto.

What is claimed is:

1. In a limb shaker for attachment to a tree and having an elongated frame, a primary limb pad, means for mounting said primary limb pad on one end of said frame, a clamp member, a secondary limb pad on said clamp member, means on said frame for moving said clamp member to move said secondary limb pad toward and away from said primary limb pad, the combination of a crank shaft, means for mounting said crank shaft in said frame for rotation relative to said frame about a first transverse axis, a crank pin, means for journalling said crank pin on said crank shaft for rotation relative to said crank shaft about a second transverse axis, a motor on said frame, means for coupling said motor to said crank shaft for rotating said crank shaft about said first transverse axis, means forming a coupling between said crank shaft and said crank pin for rotating said crank pin about said second transverse axis at twice the speed of rotation of said crank shaft about said first transverse axis, and a weight fastened only on said crank pin and eccentric with respect to said second transverse axis.

2. A limb shaker for attachment to a tree comprising a frame, a crank shaft, means for mounting said crank shaft in said frame for rotation about a first axis, means on said frame for rotating said crank shaft about said first axis, a crank pin, means for journalling said crank pin on said crank shaft for rotation about a second axis parallel to said first axis, means on said frame for rotating said crank pin about said second axis at twice the rate of rotation of said crank shaft about said first axis, an eccentric weight fastened only on said crank pin, and means on said frame for clamping said frame to a tree limb whereby straight line motion is imparted to said clamping means.

3. A limb shaker as in claim 2 in which said clamping means is disposed in line with said second axis and with said eccentric weight when said eccentric weight is at a maximum excursion from said first axis.

4. A limb shaker comprising a frame, a pair of journals in said frame and in alignment on a first axis, a crank shaft mounted in said journals and having a pair of crank cheeks, a pair of journals in said crank cheeks and in alignment on a second axis parallel to said first axis, a crank pin mounted to rotate in said journals, an eccentric weight fastened on said crank pin, a first sprocket of a predetermined diameter fast on said crank pin, a second sprocket of twice said predetermined diameter on said crank shaft, a chain trained around and engaging said first sprocket and said second sprocket, means on said frame for turning said crank shaft about said first axis, and means on said frame for engaging a tree.

5. A limb shaker comprising a frame, a first journal in said frame, a crank shaft mounted in said journal for rotation about a first axis, means on said frame for so rotating said crank shaft, a crank cheek extending from said crank shaft, a second journal in said crank cheek, a crank pin mounted in said second journal for rotation about a second axis parallel to said first axis, an eccentric weight on said crank pin, said crank pin having a portion lying in the same plane as said crank pin and defining a substantially crescent-shaped cut-away portion adapted to receive said crank cheek, and means for rotating said crank pin in the same direction as said crank shaft and at twice the rotational speed of said crank shaft.

6. A limb shaker comprising a frame, a first journal in said frame, a crank shaft mounted in said journal for rotation about a first axis, means on said frame for so rotating said crank shaft, a crank cheek extending from said crank shaft, a second journal in said crank cheek, a crank pin mounted in said second journal for rotation about a second axis parallel to said first axis, an eccentric weight fastened on said crank pin, a first sprocket on said crank shaft, a second sprocket on said crank pin, said second sprocket being one-half the diameter of said first sprocket, a chain trained around and engaging said sprockets, and means on said frame for engaging a tree limb.

7. A limb shaker as in claim 5 in which said crank cheek and said crank pin when occupying one position of relative rotation are substantially circular in combined configuration when looked at along said first axis.

References Cited

UNITED STATES PATENTS

| | | | |
|---|---|---|---|
| 1,897,140 | 2/1933 | Perez | 74—52 |
| 2,700,268 | 1/1955 | Lowe | 56—328 |
| 2,940,539 | 6/1960 | Richey | 56—328 X |
| 3,041,811 | 7/1962 | Sides | 56—328 |
| 3,084,967 | 4/1963 | Harrett | 56—328 X |
| 3,121,304 | 2/1964 | Herbst | 56—328 |
| 3,212,250 | 10/1965 | Aulabaugh | 56—328 |

ROBERT E. BAGWILL, *Primary Examiner.*